No. 658,222. Patented Sept. 18, 1900.
C. SCHIFFLIN.
WATER CLOSET BOWL.
(Application filed June 23, 1900.)
(No Model.)
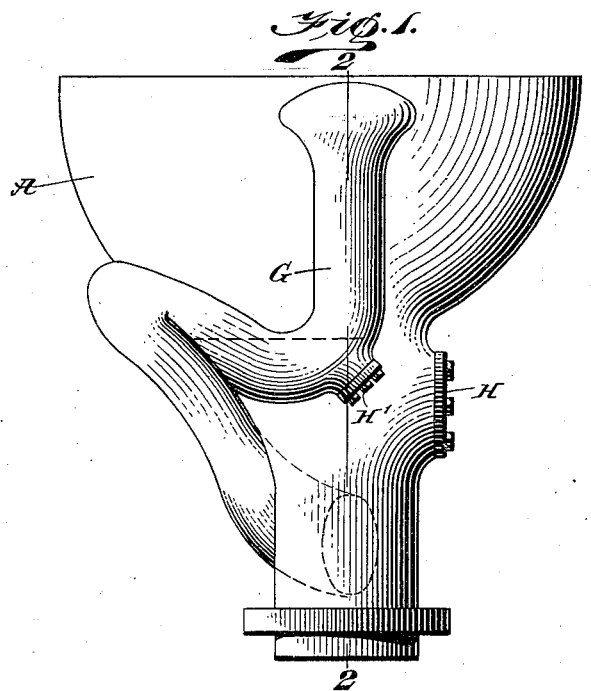
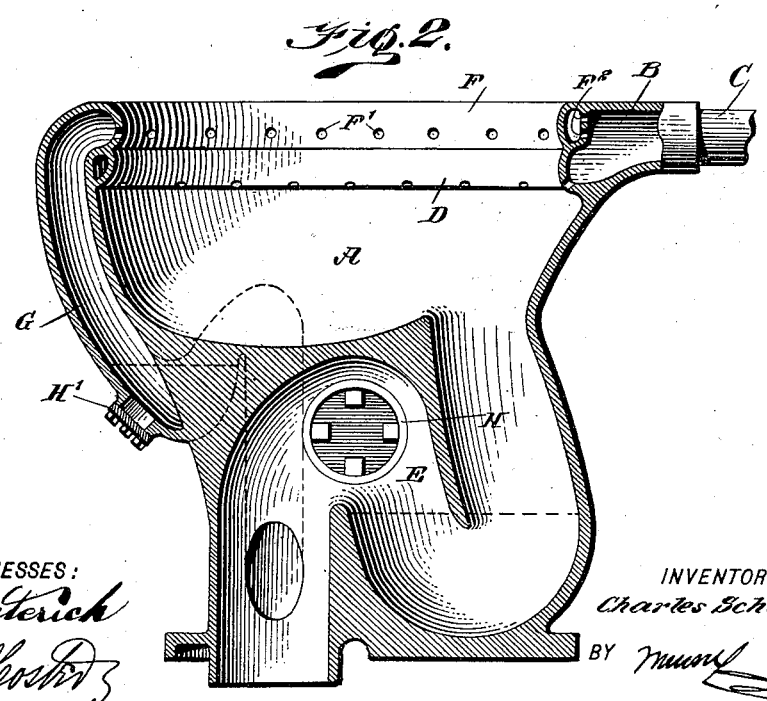

UNITED STATES PATENT OFFICE.

CHARLES SCHIFFLIN, OF NEW YORK, N. Y., ASSIGNOR OF ONE-HALF TO CHARLES F. WILDEY, JR., OF SAME PLACE.

WATER-CLOSET BOWL.

SPECIFICATION forming part of Letters Patent No. 658,222, dated September 18, 1900.

Application filed June 23, 1900. Serial No. 21,349. (No model.)

*To all whom it may concern:*

Be it known that I, CHARLES SCHIFFLIN, a citizen of the United States, and a resident of the city of New York, borough of Manhattan, in the county and State of New York, have invented a new and Improved Water-Closet Bowl, of which the following is a full, clear, and exact description.

The object of the invention is to provide certain new and useful improvements in water-closet bowls whereby overflow of water and other liquid matter from the bowl into the room in which the bowl is located is completely prevented and at the same time the bowl is prevented from getting foul and obnoxious sewer-gases are completely trapped and are not liable to pass into the room.

The invention consists of novel features and parts and combinations of the same, as will be fully described hereinafter, and then pointed out in the claims.

A practical embodiment of the invention is represented in the accompanying drawings, forming a part of this specification, in which similar characters of reference indicate corresponding parts in both the views.

Figure 1 is a front elevation of the improvement, and Fig. 2 is a transverse section of the same on the line 2 2 in Fig. 1.

Water-closets as heretofore constructed and used in hotels, restaurants, and other much-frequented places often become clogged up in the inlet or trap, and when this takes place and the trap is used then the subsequent water discharged into the trap overflows with offensive matter into the water-closet, and in order to prevent this overflow of water and offensive matter into the water-closet in case the bowl-outlet becomes clogged I provide efficient means, presently to be described in detail.

The bowl A is provided with the usual inlet B, connected with a water-supply pipe C, and the inlet opens into an annular perforated water distributing and flushing channel D, so that the bowl is flushed with the incoming water and the matter passes through the main outlet-trap E to the soil-pipe in the usual manner. Directly above the distributing and flushing channel D is arranged integrally on the bowl an annular perforated overflow-channel F, discharging into an auxiliary S-trap G, having its discharge-leg opening into the discharge-leg of the main trap E. Now in case the bowl becomes clogged at the inlet-leg of the main trap E and the water and offensive matter rise within the bowl, then the liquid matter finally overflows through the perforations F' into the channel F, to pass from the latter by way of the trap G and the outlet-leg of the trap E to the soil-pipe.

In order to keep the overflow-channel F and the auxiliary trap sweet at all times, the water-inlet B is connected by perforations $F^2$ with said channel F, so that every time the bowl A is flushed a portion of the flushing-water passes from the inlet B through the perforations $F^2$ into the channel F and through the trap G for the purpose mentioned.

The traps E and G are provided with suitable hand-holes H and H', respectively, for cleaning the traps whenever desired.

It will be seen that by the arrangement described obnoxious gases from the soil-pipe cannot pass into the room by way of the overflow-channel F, owing to the auxiliary trap G, and the latter cannot become clogged by malicious persons, as the trap cannot be reached the same as the trap E, which opens directly into the bowl.

Having thus fully described my invention, I claim as new and desire to secure by Letters Patent—

1. A water-closet bowl having a water-inlet, a main trap as an outlet for the bowl, a water-distributing channel in communication with the inlet, an annular overflow-channel above said distributing-channel, all the parts being integral with the bowl, and an auxiliary trap leading from said overflow-channel, as set forth.

2. A water-closet bowl having a water-inlet, a main trap as an outlet for the bowl, a water-distributing channel in communication with the inlet, an annular overflow-channel above said distributing-channel, and an auxiliary trap leading from said overflow-channel, the outlet-leg of the auxiliary trap being connected with the outlet-leg of the main trap, as set forth.

3. A water-closet bowl having a water-inlet, a main trap as an outlet for the bowl, an annular water-distributing channel in communication with the inlet, an annular overflow-channel above said distributing-channel and also in communication with the water-inlet and an auxiliary trap leading from said overflow-channel to the outlet-leg of the main trap, as set forth.

4. A water-closet bowl having a water-inlet, a main trap as an outlet for the bowl, an annular water-distributing channel in communication with the inlet, an annular overflow-channel above said distributing-channel, an auxiliary trap leading from said overflow-channel to the outlet-leg of the main trap, means for connecting the overflow-channel with the water-inlet, and cleaning-holes for said traps, as set forth.

In testimony whereof I have signed my name to this specification in the presence of two subscribing witnesses.

CHARLES SCHIFFLIN.

Witnesses:
THEO. G. HOSTER,
EVERARD BOLTON MARSHALL.